UNITED STATES PATENT OFFICE.

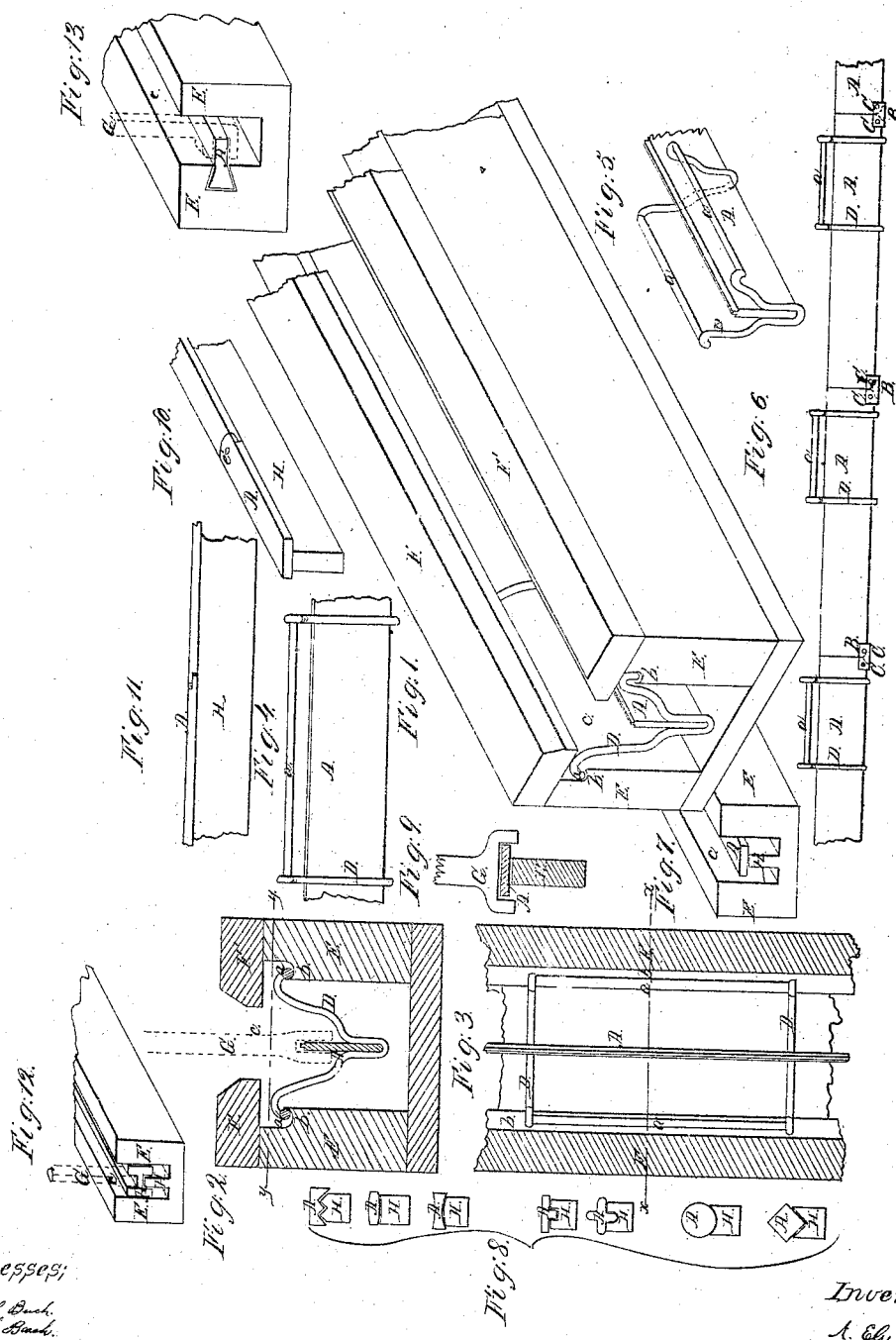

A. ELY BEACH, OF STRATFORD, CONNECTICUT.

IMPROVEMENT IN SLIDING DRAFT-CABLES FOR RAILROADS.

Specification forming part of Letters Patent No. 49,697, dated September 5, 1865.

*To all whom it may concern:*

Be it known that I, A. ELY BEACH, of Stratford, Fairfield county, State of Connecticut, have invented a new and useful Improvement in Sliding Draft-Cables; and I do hereby declare that the following is a full and exact description of my invention, which will enable any person skilled in the art to make and use the same, reference being had to the accompanying drawings, forming a part of this specification, in which drawings the same letters indicate similar parts in all the figures.

One of the objects of my improvements is to facilitate the propulsion of railroad-cars in cities, where the use of horses and of locomotives cannot be advantageously applied. My improvements are, however, applicable to all purposes to which draft-cables can be adapted. When passenger or other cars or vehicles are to be propelled in cities I employ a grooved track or channel embedded in the ground, so that vehicles and foot-passengers may readily pass over said channel. This channel or groove may be located in such position as is found most desirable or convenient. One very convenient method is to arrange the channel or groove in or under the ordinary rails upon which the car-wheels run. Within the said groove or channel I arrange my sliding draft-cable, the construction of which is such that an arm or rod may be extended down from the car into the groove or channel, and the said arm may be made to seize and hold the said cable, or the said rod may be released from the cable at the will of the operator. Thus when the cable is set in motion, by means of drums and steam-engines or other motors the cars will be moved whenever they are connected with the cable, and the cars will be stopped when disconnected from the cable.

Figures 1, 2, 3, 4, 5, 6 illustrate one of the forms of my improvement, in which the cable is supported upon sliding ears or frames. Fig. 1 is a perspective view, showing the application of my invention to the track of a railroad.

A is the draft-cable, which consists of a thin bar of steel or other suitable metal of sufficient strength and elasticity. The track upon which the car-wheels run, instead of being composed of a single bar of iron with a central depression or groove, I make in two parts, F F', each of which rests upon a sleeper, E E. These rails and sleepers are separated, so as to leave between them a narrow groove or channel, c, in which the cable A moves. The cable A is suspended or supported by means of ears made in one piece with the cable, or attached thereto in any suitable manner, which ears rest upon or run in grooves arranged in the sleepers or walls of the channel or groove which the cable traverses. In the example shown in the drawings the ears D are made in the form of frames, which are pinched or bent together at their lower parts so as to grasp the lower part of the cable. The upper parts of the ears D are provided with longitudinal bars a, and the ears D are so formed that the bars a will fit into grooves or guides b, which are arranged in the walls or sleepers E, as shown. The grooves b are to be lined with soft metal, and are to contain oil for the lubrication thereof, so that the cable may slide with but little friction. The rails F F' project over the grooves b and prevent the access of dirt thereto. All the dirt, water, and other obstructions which enter the groove c will fall below the cable, and may be removed from the groove by means of scrapers attached to the cable and by means of openings in the groove at proper intervals, which openings serve to drain and keep the groove clear.

Fig. 2 is an end elevation of the parts above described, G being the rod or arm which projects from the car to seize the cable. Fig. 3 is a plan view of the above-described parts. Fig. 4 is a side elevation of a portion of the cable and supporting-ears before described, and Fig. 5 is a perspective view of the same.

The cable A is intended to be sufficiently thin laterally that it may bend so as to accommodate itself to the curved surfaces of propelling-drums and the curves of the railroad-track.

In order to permit vertical flexibility, and also for convenience in manufacture, the cable A is composed of a series of separate bars or links, which are connected together by means of straps B and pivots C, as shown in Fig. 6, which is a side elevation of several of the cable-links with their supporting-ears. The links will be made as long as desired, and the straps and pivots will be proportioned in size and strength to the work to be done by the cable.

Instead of having the cable suspended upon ears it may be supported upon a suitable bar or ridge arranged in the channel or groove, between the walls thereof. Fig. 7 is a perspective view illustrating this method, in which the supporting-bar H receives the cable A upon its upper surface, the cable being laid flat in this example instead of standing vertically, as in Fig. 1. Referring again to Fig. 7, it will be observed that the surface upon which the cable slides is covered and protected by the cable itself, and if the said surface is lubricated the cable will slide easily thereon, and dirt cannot have access to said surface. All obstructions that enter the groove c will fall below the cable, as before described.

It will be obvious that there are many forms of cables that may be employed, which may be supported in the manner described, some of which forms may be used by reason of cheapness or facility of manufacture. Other forms may be made, having the surface which rests upon the supporting surface or rail made specially to facilitate lubrication, or the avoidance of friction, or the avoidance of lateral displacement or vertical displacement. Several forms are illustrated in red outline in Fig. 8, which are end elevations of such forms of cables with supporting-surface.

The method by which the cable is seized by the car arm or rod will be understood by reference to Fig. 9, which is an end view of the supporting-bar H and flat cable, the red lines indicating the car-arm.

In order to facilitate the lateral bending of the flattened form of cable, it is made in suitable links, which are pivoted together, as indicated at e', Fig. 10, which is a perspective view of a portion of such pivoted cable-links and support thereof. Fig. 11 is a side elevation of the same.

Fig. 12 is a perspective view, which illustrates a form of cable which is grooved both upon its upper and lower surfaces. The under grooved surface of the cable fits upon and covers its supporting-rail, on which it slides. The object of the upper groove upon the cable is to receive the car arm or rod, which is made in the form of a blade, as shown in red. When this blade is turned its edges bind or press the surfaces of the groove in the cable, and thus connect the car and cable together.

Fig. 13 illustrates, in perspective view, a method of supporting the cable within one of the walls of the groove. The cable projects laterally from a groove made within the said wall, as shown, the inner edge of the cable being enlarged or otherwise formed, so that it cannot become laterally displaced, though it moves longitudinally within the groove in said wall. The lower part of the arm which connects the car with such cable is bent at right angles, so as to grasp the said cable, as shown in red.

The improvements herein described may be used in connection with any of the parts or devices which are described in and form portions of the subject matter of my other improvements and Letters Patent pertaining to draft-cables, railroad-cars, and railroad-tracks.

These improvements are applicable to all forms of railroads, elevated tracks, and all purposes for which cables can be employed.

Having thus described my invention, I claim and desire to secure by Letters Patent—

1. The combination of a cable and a supporting-surface, substantially as described, so that the rubbing-surfaces will be protected by the cable.

2. The suspension of draft-cables upon sliding ears or bars, substantially as described.

3. The combination of the supporting-frames with the cable, substantially as described.

4. The construction of the wall or walls of the groove or channel in which the cable runs, with grooves or bearings to receive and support the cable or the ears thereof, substantially as described.

A. ELY BEACH.

Witnesses:
A. BOLCÉ,
K. NIDA.